Sept. 30, 1924.  
G. WEISSMANN  
1,510,364  
ELECTRIC BATTERY WITH AN ABSORBED LIQUID  
Filed May 16, 1922     2 Sheets-Sheet 1
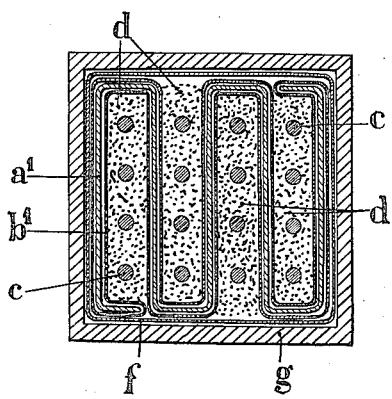
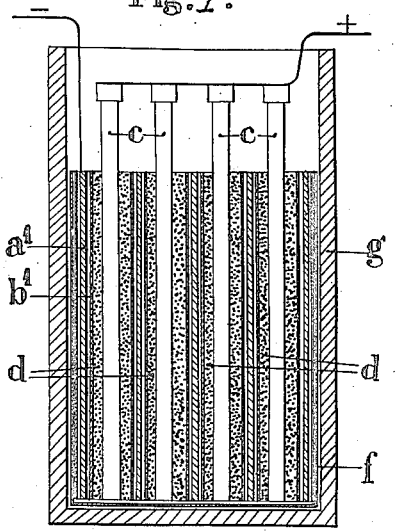
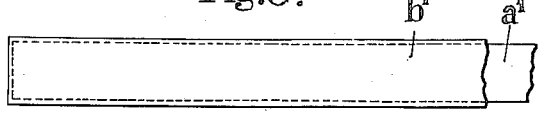
Inventor.  
Gustave Weissmann.  
by  
Attorneys.

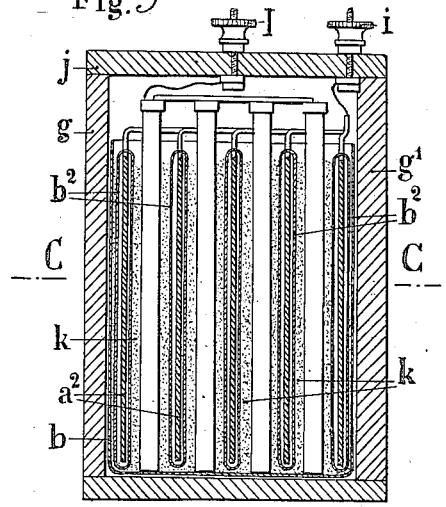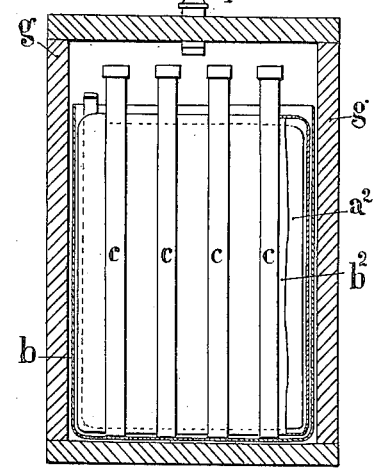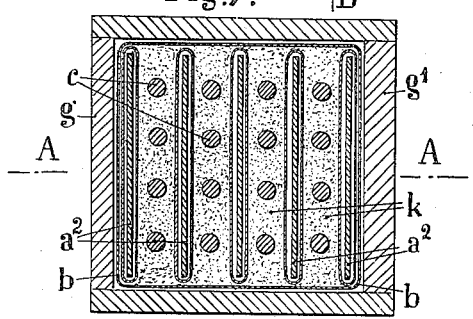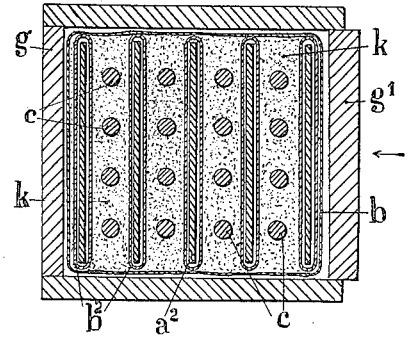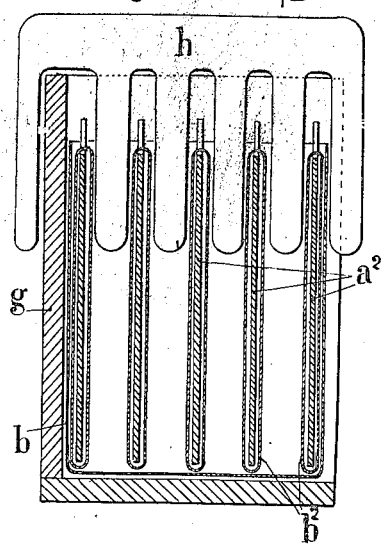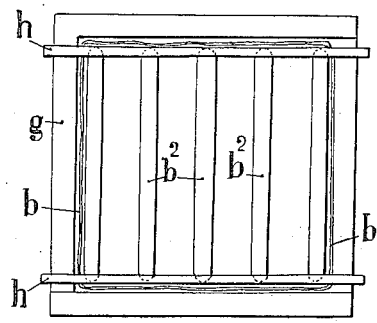

Patented Sept. 30, 1924.

1,510,364

UNITED STATES PATENT OFFICE.

GUSTAVE WEISSMANN, OF PARIS, FRANCE.

ELECTRIC BATTERY WITH AN ABSORBED LIQUID.

Application filed May 16, 1922. Serial No. 561,427.

*To all whom it may concern:*

Be it known that I, GUSTAVE WEISSMANN, of 7 Rue Pierre Le Grand, Paris, France, have invented an Electric Battery with an Absorbed Liquid, of which the following is a full, clear, and exact description.

In the actually known batteries with an absorbed liquid of the Leclanché type for instance, the depolarizing agent, usually composed of a mixture of dioxide of manganese and graphite, is agglomerated about the positive carbon electrode and the electrolyte is introduced in the state of a paste between the depolarizing agglomerate and the zinc constituting the negative electrode.

These batteries, owing to this method of constitution have following inconveniences:

1. Their manufacture requires special implements, moulds, presses, etc., for agglomerating the depolarizing agent on the carbon constituting the positive electrode and necessitates the use of an agglomerating material which in electricity is inoperative and diminishes the capacity of the battery.

2. The highly compressed depolarizing agent allows the electrolyte to pass but with great difficulty, so much the more as the latter is introduced in a pasty state; owing to this imperfect diffusion of the electrolyte through the depolarizing agent the capacity of the battery is still further sensibly diminished.

This invention relates to a battery with an absorbed liquid, the constitution of which does away with the inconveniences above mentioned.

The battery forming the subject matter of the invention is essentially characterized by the following combination:

a. a negative electrode having multiple parallel plane elements, constituting within the jar, which encloses the various parts composing the battery, a partitioning which thus forms a series of compartments; this negative electrode is covered with a spongy insulating coating.

b. a positive electrode, having also multiple elements, constituted by sticks or plates, connected together and placed in the compartments formed by the negative electrode.

c. a depolarizing material, in a divided state, filling the said compartments and compressed in the latter.

d. and electrolyte impregnating this depolarizing material and the spongy insulating coating of the negative electrode.

The whole of these positive and negative electrodes and of this depolarizer impregnated with electrolyte, can be enclosed in a flexible fluid-tight bag.

In this type of battery the electrolyte, owing to its fluidity, infiltrates throughout the body of the depolarizing material which is simply packed, resulting in a perfect diffusion of this electrolyte through the depolarizings mass; the main following advantages are thereby obtained:

1. Increase of the capacity relatively to existing batteries of the same weight or volume or with an equal capacity, considerable diminution of the weight and volume.

2. Diminution of the internal resistance of the battery.

3. More rapid and more economical manufacture.

The combination above set forth moreover allows, for a battery of given dimensions, of increasing the surface of the electrodes and of reducing to a minimum the distance between the electrodes of reverse polarities; it results therefrom that the internal resistance of the battery is very small, that its capacity is increased and that the curve of discharging of this battery, on a determined resistance shows, in a given time, a drop of potential very sensibly inferior to that noted on existing batteries.

Moreover, owing to the close arrangement of the electrodes and to their large number, the depolarization is considerably more rapid than in other batteries.

The invention is further characterized by a method of construction in which the flexible bag and its contents are arranged in a rigid vat, one side of which is movable and may be used for compressing within the vat itself, when all the elements are placed in position, the depolarizing material contained in the various compartments and for ensuring a very intimate contact of this depolarizing material with the elements constituting the positive electrode and the negative electrode.

In this form of construction, the negative electrode is constituted by independent plates connected together, owing to the independency of these plates the pressure exerted on the movable side of the rigid vat, during the manufacture of the battery, is uniformly transmitted throughout the body of the depolarizing material.

In order that this invention may be clearly understood, several methods of construction of the improved battery will be described hereafter with reference to the accompanying drawing in which, Figs. 1 and 2 illustrate in vertical section and horizontal section respectively a battery element.

Fig. 3 is a detail view showing on a smaller scale a portion of the developed negative electrode of this battery.

Fig. 4 is a cross section of the same.

Figs. 5 and 6 are two vertical sections of the battery made respectively according to lines A—A and B—B of Fig. 7.

Fig. 7 is a horizontal section made according to line C—C of Fig. 5.

Figs. 8 and 9 illustrate in vertical section and plan view the method of placing in position the elements constituting the negative electrode during the manufacture of the battery.

Fig. 10 is a horizontal section of the battery before compression of the depolarizing material.

In the type of battery shown in Figures 1 and 2 negative electrode is constituted by a zinc strip $a^1$ protected by a pervious envelope $b^1$ which is not attacked by the electrolyte or the depolarizing material, as shown in Figs. 3 and 4.

This negative electrode is bent as illustrated in Fig. 2 so as to form several compartments; in each of the latter are arranged carbon sticks $c$. The interval between the said sticks and the negative electrode is filled with the depolarizing material $d$ in powder form constituted, for instance, by a mixture of bioxide of manganese and of graphite; this depolarizing material thus introduced in the form of powder is packed or compressed so as to present however a mass sufficiently porous for subsequently absorbing the electrolyte.

The electrolyte constituted, for instance, as usual by a solution of ammonium chloride is poured on the depolarizing material; preferably, depolarizing material may first be packed up to a certain level, the electrolyte may be then introduced and the remainder of the depolarizing material may be poured in the liquid paste thus obtained.

The carbon sticks $c$, constituting the positive electrode, are connected together at their upper part as shown in Fig. 1.

The negative electrode is surrounded by a protecting envelope $f$ and the whole is placed in a vat $g$ which is fluid-tight or is rendered fluid-tight.

This vat is finally sealed at its upper part by a layer of wax in the usual manner.

The negative electrode might be bent according to any other shapes.

The method of construction illustrated in Figs. 5 to 10 comprises a rigid vat $g$ of any suitable material, open on one of its sides, which is subsequently closed by a panel $g^1$; within this vat is placed a bag $b$ made of flexible, fluid-tight and insulating material, such as oiled cloth, rubber, rubberized cloth, etc.

In this bag $b$ are first introduced the plates $a^2$ constituting the negative electrode, zinc plates for instance. Each plate is encased in an insulating and pervious material $b^2$, such for instance as, filtering paper, canvas, etc. These plates are arranged parallel to the movable side $g^1$ of the rigid vat and are equally spaced apart so as to reserve between them equal intervals.

For facilitating their placing in position, comb members $h$ mounted on the rigid vat $g$ might for instance be used, as shown in Figs. 8 and 9; the negative plates $a^2$ are fitted between the teeth of these comb members, as shown in these figures, and are thus held in place at equal intervals during the manufacture of the battery.

The negative plates $a^2$ are electrically connected together and to a terminal $i$ carried by the cover $j$ of the rigid vat.

In each of the compartments thus constituted by these negative plates is poured the depolarizing material $k$, in a divided state, composed for instance, as previously mentioned, of a mixture of dioxide of manganese and graphite.

The electrolyte, constituted for instance as usual by a solution of chloride of ammonium is poured in the liquid state on the depolarizing material so as to imbibe it.

When the depolarizing material contained in each of the compartments formed by the negative plates $a^2$ has completely absorbed the electrolyte, carbon sticks $c$ constituting the positive electrodes are driven in this depolarizing material; these carbon sticks are electrically connected together and with a second terminal $l$ carried by the cover $j$ of the rigid vat.

All the elements being placed in position the comb members $h$ are removed, then, through the open side of the vat $g$, the movable panel $g^1$ is fitted as shown in Fig. 10 on the corresponding face of the bag $b$ and the battery is subjected to the action of a press so as to exert on this panel a lateral pressure and to engage it within the vat $g$ (Figs. 5 and 7); under the action of the lateral pressure transmitted by the movable panel $g^1$ to the flexible bag $b$, the depolarizing material, contained in the various compartments constituted by the negative plates $a^2$, is subjected to a compression within the vat and owing to the independency of these negative plates $a^2$, this compression is uniformly transmitted throughout the mass of the depolarizing material and throughout its height.

The thickness of the movable panel $g^1$ is determined in such a manner that the required degree of compression of the depolarizing material is obtained at the time the outer face of this panel comes level with the edges of the vat.

When this compression is completed, the movable panel $g^1$ is secured to the vat $g$ by any means whatever, for instance by nails or screws.

The vat $g$ is finally sealed in the usual manner by a layer of wax or other suitable material, then the cover $j$ is placed in position.

The present system of battery, which has just been described, is applicable to different types of batteries using various electrodes or depolarizing materials and according to the applications, various modifications may be made in the nature or constitution of the constituent elements of the battery.

Thus, for instance, in case of a battery in which oxide of copper is used as depolarizing material and potash as electrolyte, the flexible bag $b$ will be made of rubber for example. The pervious envelopes $b^2$ of the negative zinc plates will be constituted by asbestos fabric and the elements constituting the positive electrode will be made of copper, in the shape of sticks, plates or fabric.

In the system of battery forming the subject matter of this invention, the electrolyte may be poured only when all the depolarizing material has been introduced, so that the electrolyte may be poured only at the time the battery is to be utilized. In this case the latter may comprise a short pipe permitting the introduction of the electrolyte, this short pipe being subsequently closed by a stopper. In order to facilitate the diffusion of the electrolyte throughout the mass of the depolarizing material this short pipe might extend in a tube embedded in the depolarizing material and provided with holes at different levels.

In other cases, the electrolyte may be mixed previously with the depolarizing material, so as to constitute a paste which may be poured in the chamber or compartments constituted by the negative electrode or electrodes.

Claims:

1. A battery with an absorbed liquid, comprising in combination; a jar,—a negative electrode having multiple parallel plane elements constituting, within this jar, a partition which forms a series of compartments, —a spongy insulating coating covering this negative electrode, a positive electrode having multiple elements placed in the compartments formed by the negative electrode, —a depolarizing material, in a divided state, filling the said compartments and packed or compressed in the latter in such a way that it is in direct contact at the same time with the negative electrode covered with its envelope and with the positive electrode,—and electrolyte impregnating this depolarizing material and the spongy insulating coating of the negative electrode.

2. A battery with an absorbed liquid, comprising in combination; a jar,—a negative electrode constituted by a zinc strip so bent as to present multiple parallel plane elements constituting, within this jar, a partitioning which forms a series of compartments,—a spongy insulating coating covering this negative electrode,—a positive electrode having multiple elements placed in the compartments formed by the negative electrode,—a depolarizing material, in a divided state, filling the said compartments and packed or compressed in the latter in such a way that it is in direct contact at the same time with the negative electrode covered with its envelope and with the positive electrode,—an electrolyte impregnating this depolarizing material and the spongy insulating coating of the negative electrode.

3. A battery with an absorbed liquid, comprising in combination: a jar,—a negative electrode having multiple parallel plane elements constituting, within this jar, a partitioning which forms a series of compartments,—a spongy insulating coating covering this negative electrode, a positive electrode having multiple elements placed in the compartments formed by the negative electrode,—a depolarizing material, in a divided state, filling the said compartments and packed or compressed in the latter in such a way that it is in direct contact at the same time with negative electrode covered with its envelope and with the positive electrode,—an electrolyte impregnating this depolarizing material and the spongy insulating coating of the negative electrode,—a flexible and fluid-tight bag enclosing the whole of the positive and negative electrodes and of the depolarizing material impregnated with electrolyte,—means for exerting a lateral compression on the said bag.

4. A battery with an absorbed liquid, comprising in combination; a jar, one of the sides of which is movable,—a negative electrode having multiple parallel plane elements constituting, within this jar, a partitioning which forms a series of compartments,—a spongy insulating coating covering this negative electrode,—a positive electrode having multiple elements placed in the compartments formed by the negative electrode,—a depolarizing material, in a divided state, filling the said compartments and packed or compressed in the latter in such a way that it is in direct contact at the same time with the negative electrode covered with its envelope and with the positive electrode,—an electrolyte impregnating this depolarizing material and the spongy insulating coating of the negative electrode,—a flexible and fluid-tight bag enclosing the whole of the positive and negative electrodes and of the depolarizing material impregnated with electrolyte,—means for utilizing the movable side of the jar as compression plate for the said bag.

The foregoing specification of my electric battery with fixed liquid, signed by me this 5th day of May, 1922.

GUSTAVE WEISSMANN.